(12) United States Patent
Hartley et al.

(10) Patent No.: US 6,473,414 B1
(45) Date of Patent: *Oct. 29, 2002

(54) CARRIER SENSE COLLISION AVOIDANCE WITH AUTO ABORT

(75) Inventors: Lee F. Hartley, Calgary (CA); Danny McKay, Toronto (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,240

(22) Filed: Dec. 23, 1996

(30) Foreign Application Priority Data

Dec. 29, 1995 (CA) .............................................. 2166343

(51) Int. Cl.[7] .................................................. H04J 3/24
(52) U.S. Cl. ...................................... 370/338; 370/445
(58) Field of Search ................................ 370/338, 443, 370/445, 448, 337, 334, 348; 395/200.55; 709/225

(56) References Cited

U.S. PATENT DOCUMENTS 4,259,663 A    3/1981  Gable
5,164,942 A  * 11/1992 Kamerman et al. .......... 370/338
5,384,777 A  *  1/1995 Ahmadi et al. .............. 370/337
5,754,947 A  *  5/1998 Tanabe et al. ............. 445/54.1

FOREIGN PATENT DOCUMENTS

| EP | 0064818 | 11/1982 | ........... H04L/11/16 |
| EP | 0224132 | 6/1987 | ........... H04L/11/16 |
| EP | 0476444 | 3/1992 | ........... H04L/12/28 |
| EP | 0621707 | 10/1994 | ........... H04L/12/28 |
| EP | 0653864 | 5/1995 | ......... H04L/12/413 |

* cited by examiner

Primary Examiner—Edwin C. Holloway, III
(74) Attorney, Agent, or Firm—Joscelyn G. Cockburn

(57) ABSTRACT

A Carrier Sense Multiple Access with Automatic Abort collision avoidance (CSMA/AA) controller for application in a wireless local area network (LAN). The CSMA/AA controller reduces the number of invalid states arising from collision conditions on the communication channel. The controller features hardware logic control for time critical functions. The hardware logic circuit detects events and fault conditions under the CSMA reservation protocol which may otherwise be missed by the Medium Access Control software layer and aborts the transmit procedure. The off-loading of time critical functions also improves the performance of the system and reduces the variability arising from overhead execution times associated with the system CPU.

7 Claims, 11 Drawing Sheets

TIMING FOR DIGITAL RECEIVER

Scenario #1

Scenario #2

Scenario #3

CARRIER SENSE COLLISION AVOIDANCE WITH AUTO ABORT

FIELD OF THE INVENTION

This invention relates to local area networks in which computers communicate with one another over a transmission medium, and more particularly to a system for avoiding collision on a wireless transmission medium between stations.

BACKGROUND OF THE INVENTION

In a local area network (LAN), a collision occurs when multiple units simultaneously attempt to access the communication channel. The communication channel is the medium through which the data carrier propagates. In a wireless network, the channel medium is free space and the data carrier comprises modulated infrared radiation. It is difficult to detect a collision between multiple units attempting to grab a wireless channel because of the inability to resolve a faint distant signal (e.g. emitted from a remote station) which is superimposed on an extremely strong local signal (e.g. emitted by a competing station).

In wired networks, a protocol known as Carrier Sense Multiple Access with Collision Detection (CSMA/CD) is utilized to detect collisions on the channel. Detection of a collision causes appropriate back-off algorithms to be executed. In a CSMA/CD based system, a station wishing to transmit a message listens until the transmission channel is idle before commencing to transmit an information packet. The station continues to listen to the channel after starting a transmission, and if a collision is detected, i.e. more than one station has commenced transmitting a data packet, the station which has detected the collision terminates its message transmission and transmits a jam pattern. The jam pattern informs all the other stations of the collision and they start executing their own back-off algorithms. The back-off algorithm includes terminating message transmission and waiting a random time before attempting to commence another message transmission.

The CSMA/CD protocol is used primarily in wired LAN. The CSMA/CD protocol is generally unsuitable for a wireless LAN comprising a single wireless channel because transmission and reception of signals cannot take place on the single channel, that is, a station cannot generally receive while it is transmitting because the dynamic range is too large. As a result the focus in wireless LANs has been on collision avoidance as opposed to collision detection. Various methods or protocols for Medium Access Control (MAC) have been developed to avoid collisions between units accessing the wireless communication channels. Such methods comprise a communication reservation protocol in which units, i.e. stations, coupled to the wireless LAN must first establish a connection with a peer station via the MAC level control frames prior to the actual data transfer. In such systems, the integrity of the negotiating control frames are very important to the effective operation of the network.

One widely used protocol for wireless LAN communication is known as CSMA/CA (Carrier Sense Multiple Access with Collision Avoidance). The CSMA/CA method attempts to minimize the likelihood of collisions between competing stations. According to the CSMA/CA protocol, access to the communication channel by multiple units is controlled by each unit's ability to detect channel activity, i.e. carrier sense, and to implement algorithms to minimize the likelihood of simultaneous access, i.e. collision avoidance. The effective operation of a network utilizing CSMA/CA depends on the integrity of the negotiating control frames. According to this known method, a reservation comprises a six packet structure, and software utilizing a Medium Access Control (MAC) layer oversees a reservation on the channel. A station wishing to transmit a data packet first broadcasts a Connect Request (CR) packet to all the stations coupled to the LAN. The CR packet includes an identification field for the originator of the reservation request and a destination field identifying the station with which the reservation is being sought. In response, the destination station broadcasts a Connect Confirm (CC) packet. The broadcast of the CC packet confirms the establishment of a reservation on the communication channel between the originator and the destination station. The originating station then transmits a data transfer (XFR) packet for the reservation. The XFR packet includes the data to be transferred and typically comprises the largest packet in the six reservation packet structure. The XFR data packet is addressed specifically to the destination station. Upon receipt of the XFR data packet, the destination station responds with a Data Transfer Acknowledge (XACK) packet to confirm reception of the data packet. The XACK packet is specifically addressed to the originator station. In response to the XACK packet, the originator station broadcasts a Disconnect Request (DR) packet which is directed to the destination station and also received by the other stations. The DR packet indicates the intention of the originating station to terminate the reservation of the communication channel. The destination station broadcasts a Disconnect Confirm (DC) packet which is directed to the originating station and also received by the other stations. Other stations which have been waiting for the communication channel to become free can now initiate their procedures (i.e. Connect Request) to gain access to the channel and establish a reservation.

Problems remain with the CSMA/CA protocol applied to wireless LANs. When a Connect Request (CR) packet is sent by a station, no other stations should attempt to transmit another Connect Request (CR) packet until the reservation awarded to the station sending the first Connect Request (CR) packet is completed and the channel is made available to the remaining stations. This means that the MAC layer software must closely monitor the status of the receiver to determine if a Connect Request (CR) packet has been sent by another station prior to sending its own CR packet. An inherent problem with this approach is that time spent executing the decision making process results in windows where the desired state could be missed and reservations corrupted by back-to-back Connect Request (CR) packets being sent by competing stations. Furthermore, the transmission of Connect Request (CR) packets by multiple stations increases the likelihood of collisions in the communication channel and confuses stations vying for the channel as to which station established the reservation. When this confusion occurs, the stations must execute back-off procedures which tend to be long and complicated. The added overhead to process and handle back-to-back Connect Request (CR) packets also impairs the throughput and efficiency of CSMA/CA based systems. A further problem with such systems arises from the fact that the execution time of the reservation protocol becomes the controlling factor to the window of error, and thus the window of error will vary based on the speed of the system CPU, i.e. microprocessor. This means that a station's susceptibility will depend in part on the speed of the microprocessor used for the system CPU.

The present invention overcomes these disadvantages by providing a system wherein software control initiates packet transmission and logic controls the entry of packets into the communication channel. The logic includes the capability to issue unconditional aborts to avoid collisions during packet transmit procedures and off-load time critical processing functions associated with the reservation protocol. The system according to the present invention provides a substantial improvement in network performance based on its ability to rigidly control entry into the communication channel of critical MAC control packets.

BRIEF SUMMARY OF THE INVENTION

The present invention provides a Carrier Sense Multiple Access with Automatic Abort collision avoidance (CSMA/AA) controller suitable for application in a wireless Local Area Network (LAN).

The CSMA/AA controller according to the present invention achieves an improvement in wireless network operation over that obtained using a conventional CSMA/CA implementation. The implementation according to the present invention reduces the number of invalid states in the MAC sub-layer which account for a large quantity of idle time periods resulting from the execution of time consuming back-off procedures.

A feature of the CSMA/AA controller is hardware logic control for time critical functions. The hardware logic provides a means to detect events and fault conditions under the CSMA reservation protocol which may otherwise be missed by the Medium Access Control software leading to collisions on the channel. This aspect of the present invention also allows the off-loading of time critical functions from the system CPU, which in turn, reduces variability arising from system overhead execution requirements and processor speed.

In a first aspect the present invention provides a local area network LAN station for use with a transceiver coupled to a communication channel for operating on the LAN, the transceiver providing receive data and transmit data ports for the station, said station comprising: (a) communication controller means coupled to said transceiver to control transmission and reception of data on said communication channel; (b) memory means for storing data to be transmitted and data to be received on said communication channel; (c) said communication controller means including receiver means coupled to the receive port of said transceiver for receiving data from said communication channel; (d) said communication controller means having transmitter means coupled to the transmit port of said transceiver for transmitting data on said communication channel; (e) said communication controller means including logic means to abort a transmission procedure when a data reception is pending; (f) said logic means being coupled to said receiver means and having means responsive to activity on said receive port for generating an abort control signal for aborting operation of said transmitter means when receive activity is detected.

In another aspect, the present invention provides a method for avoiding collision between stations communicating over a single communication channel coupled by a local area network LAN, each station including a transceiver for operating on the communication channel and receiver means for receiving data from the transceiver and transmitter means for transmitting data to the transceiver and controller means for controlling the transfer of data between the station and the communication channel and logic circuit means, said method comprising the steps of: (a) determining if said communication channel is available; (b) initiating a data transmission by generating a signal through said controller means for enabling the transmitter means when said communication channel is available from step (a); (c) enabling said logic circuit means through said controller means; (d) commencing transmission of data on said communication channel through said transceiver and transmitter means; (e) monitoring receive data activity in said receiver means using said logic circuit means; (f) aborting operation of said transmitter means by generating an abort signal through said logic circuit means in response to the detection of receive data activity; and (f) notifying said controller means of the aborted transmission.

BRIEF DESCRIPTION OF THE DRAWINGS

Reference will now be made, by way of example, to the accompanying drawings which show preferred embodiments of the present invention, and in which.

DETAILED DESCRIPTION OF THE PREFERRED EMBODIMENT

Figure 1:
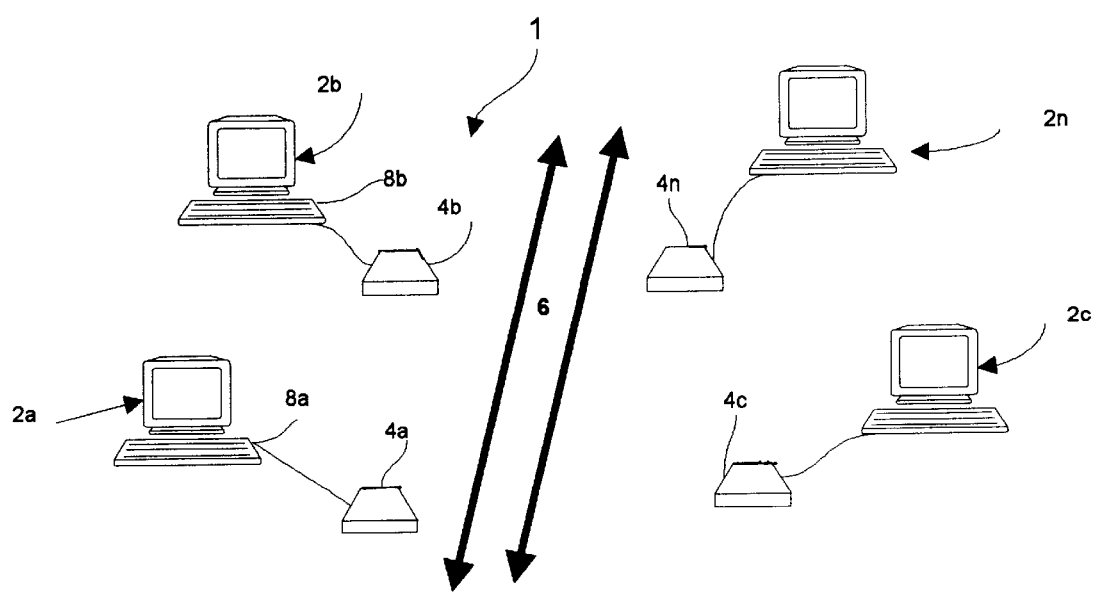
FIG. 1 is a block diagram showing computers coupled by a communications channel in a wireless Local Area Network (LAN)

Reference is first made to FIG. 1 which shows a wireless Local Area Network (LAN) of the type suitable for use with a Carrier Sense Multiple Access with Auto Abort collision avoidance controller according to the subject invention. The LAN is indicated generally by reference 1 and comprises a plurality of data processing stations, shown individually as stations 2a to 2n. Each station 2 has a transceiver 4, shown individually as transceivers 4a to 4n. The stations 2 communicate with one another over a common single wireless communication channel denoted generally by reference 6. The wireless channel 6 and transceivers 4 are implemented for a particular data carrier, such as infrared wavelength beams.

Each station 2 typically comprises a computer 8, such as a personal computer (PC). In FIG. 1, the computers 8 are shown individually as 8a to 8n and include a monitor (shown), keyboard, and other input/output devices and peripherals. The computer 8 is coupled to the transceiver 4 through a LAN controller. The LAN controller according to the present invention comprises a Carrier Sense Multiple Access with Automatic Abort controller as will now be described in detail.

Figure 2:
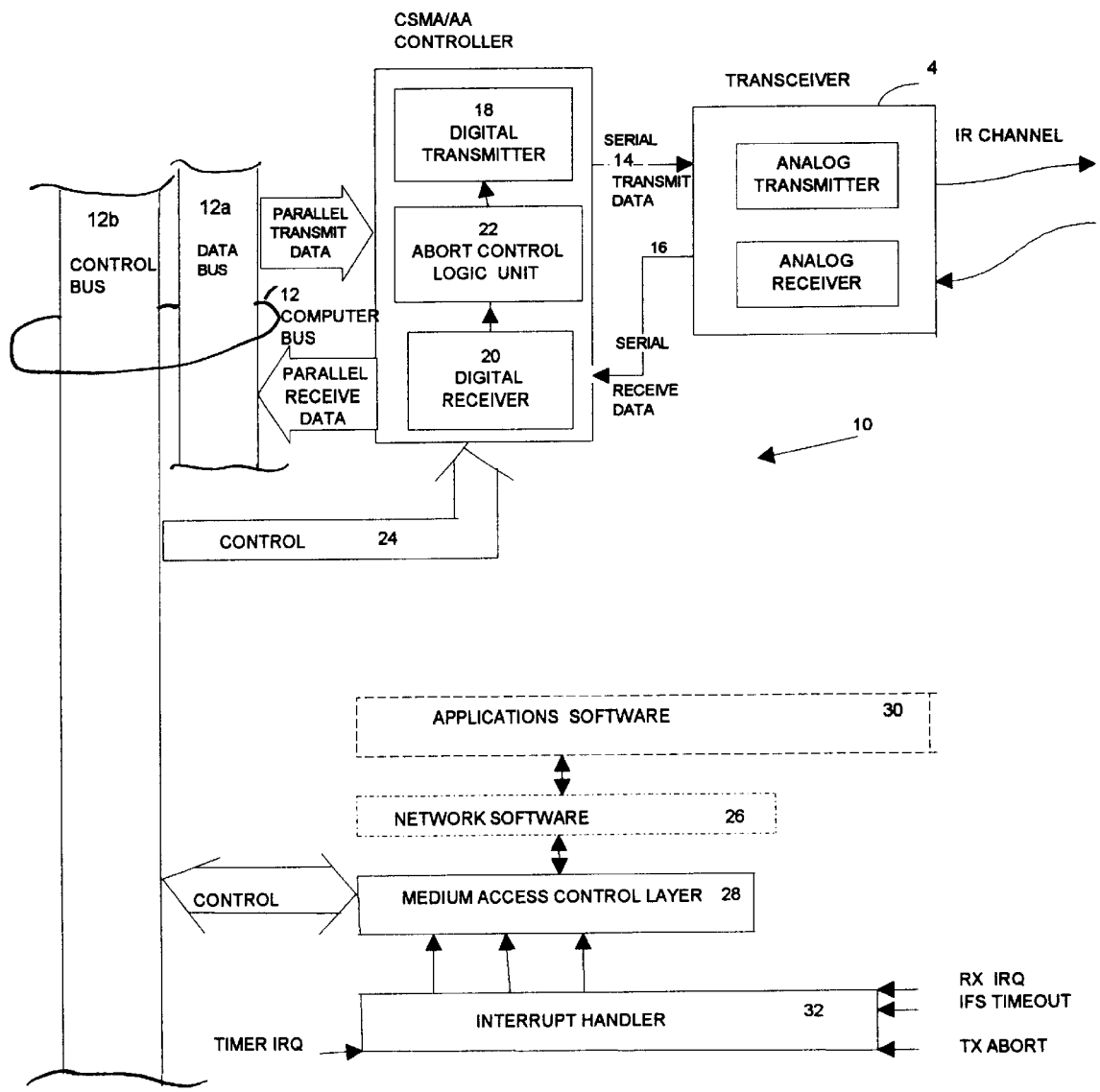
FIG. 2 is a block diagram of a Carrier Sense Multiple Access with Auto Abort (CSMA/AA) controller according to the present invention.

Reference is made to FIG. 2, which shows a Carrier Sense Multiple Access with Auto Abort collision avoidance (CSMA/AA) controller according to the present invention and indicated generally by 10. The CSMA/AA controller 10 provides the interface between the computer 8 and the transceiver 4. The CSMA/AA controller 10 is coupled to the computer 8 through the computer bus 12 comprising a data bus 12a and a control bus 12b. The data bus 12a provides a parallel bus for data transfer, and the control bus 12b provides the interface for control signals. The CSMA/AA controller 10 interfaces to the transceiver 4 on a serial transmit data line 14 and a serial receive data line 16. The transceiver 4 is implemented using known techniques, for example, conventional infrared transceiver technology.

The CSMA/AA controller 10 comprises a digital transmitter 18, a digital receiver 20, and an abort control logic unit 22. The digital transmitter 18 is coupled to the computer data bus 12a and receives data to be transmitted over the communication channel 6 from the computer 8. The digital receiver 20 transfers data received from the communication channel 6 through the transceiver 4 to the computer 8 over the data bus 12a. The CSMA/AA controller 10 is coupled to the control bus 12b of the computer 8 through a control interface 24. The computer 8 controls the CSMA/AA controller 10 through a network software module 26 (shown in broken outline) which comprises the software aspect of the controller 10 and includes a Medium Access Control layer or module 28. The MAC layer 28 manages the bulk data transfer operations over the communication channel 6 in support of requesting application programs (shown in broken outline) 30 through the network software 26 running on the computer 8. The MAC layer 28 controls the CSMA/AA controller 10 through the control bus 12b. The MAC layer 28 is responsive to interrupts which are generated by the CSMA/AA controller 10 and there is an interrupt handler denoted generally by 32 which services the interrupts associated with the controller 10 including a receive interrupt RX IRQ, an Inter-Frame Space timer interrupt IFS TIMEOUT, and a transmit interrupt TX_ABORT. It can be seen that the CSMA/AA controller 10 comprises a hardware and a software aspect. The operation of the controller 10 and the control software is described in more detail below.

Figure 3:
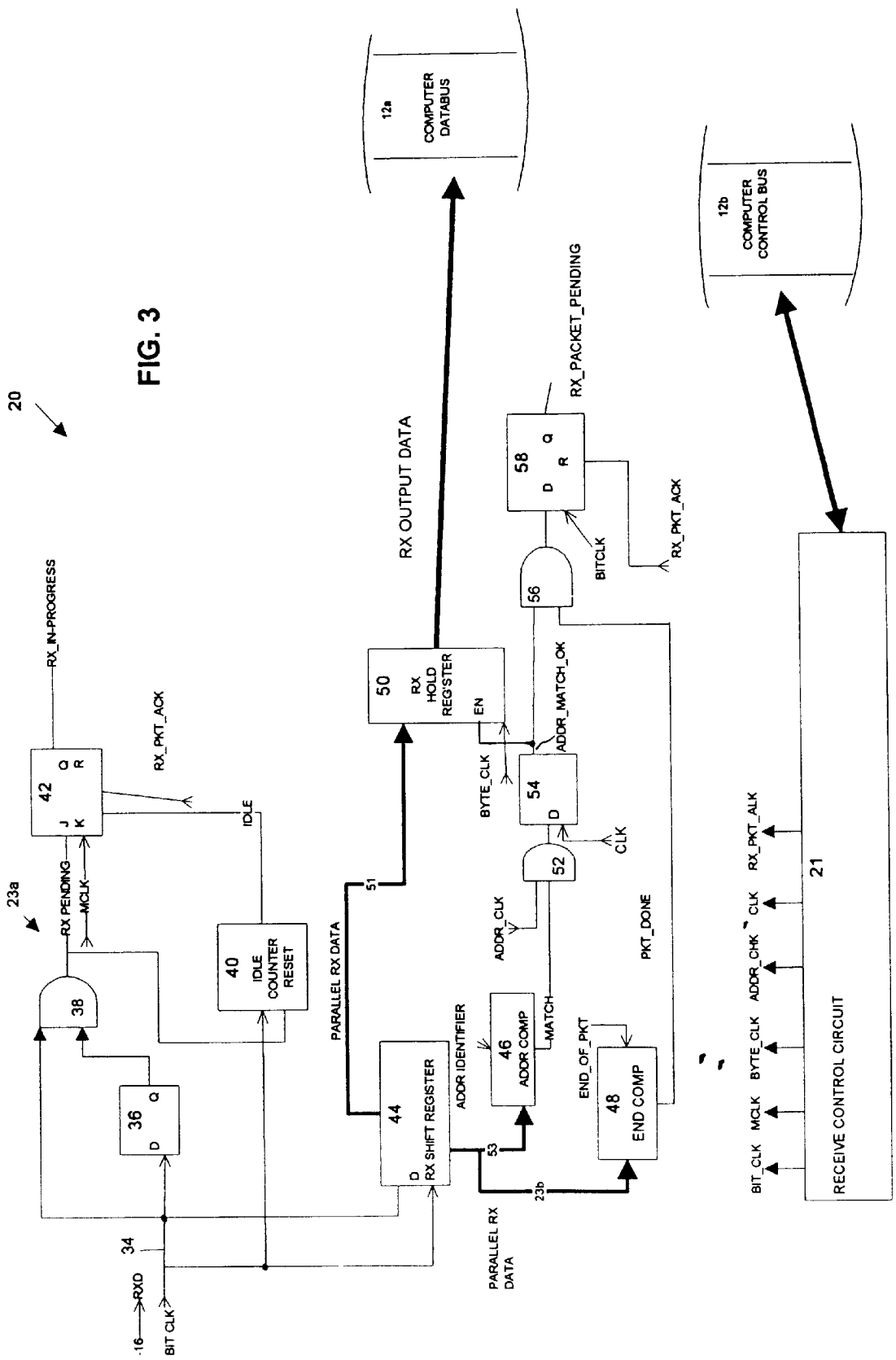
FIG. 3 is a circuit diagram of a digital receiver for the CSMA/AA controller of FIG. 2.

Reference is next made to FIG. 3 which shows the digital receiver 20 in more detail. The digital receiver 20 comprises a receive control circuit 21 and logic circuits 23a, 23b. The receive control circuit 21 interfaces to the control bus 12b and generates internal signals and handles the handshaking and control from the MAC layer 28 and the network software 26. The logic circuits 23a, 23b detect activity on the serial receive line 16 and manage the transfer of receive data RXD between the transceiver 4 and the computer data bus 12a. As will be described, the logic circuits 23a, 23b also generate control signals RX_IN_PROGRESS and RX_PACKET_PENDING. The RX_IN_PROGRESS and RX_PACKET_PENDING provide control signals for the Abort Control logic 22 (FIG. 4) as will be described below. The RX_PACKET_PENDING signal also comprises the interrupt RX IRQ which is used by the MAC software layer 28.

As shown in FIG. 3, the receiver 20 has an input 34 for inputting the serial receive data RXD from the transceiver 4. The input 34 is connected to the serial receive line 16 (FIG. 2). In addition to the RX_IN_PROGRESS and RX_PACKET_PENDING signals, the receiver 20 includes an output for RX Output Data which comprises a parallel, e.g. byte-wide, output port coupled to the computer data bus 12a for transferring data received from the communication channel 6.

The RX_IN_PROGRESS signal is generated whenever RXD data is received on the receive line 16. The logic circuit 23a for generating the RX_IN_PROGRESS signal comprises a flip-flop 36, an exclusive OR (XOR) gate 38, an idle counter 40 and a JK flip-flop 42. The RXD input 34 is connected to the input of the flip-flop 36 and also to one input of the XOR gate 38. The output of the flip-flop 36 provides the other input for the XOR gate 38. The flip-flop 36 is clocked by BIT_CLK to latch the RXD bit. BIT_CLK also provides the clocking signal for the idle counter 40. The output of the XOR gate 38 is connected to the "J" (set) input of the JK flip-flop 42. The output from the idle counter 40 is connected to the "K" (reset) input of the JK flip-flop 42. The output of the XOR gate 38 is also connected to the RESET input of the idle counter 40. The JK flip-flop 42 is clocked by MCLK.

Referring to FIG. 3, logic transitions on the RXD line 34 indicate that serial receive data is being received from the transceiver 4, i.e. the communication channel 6 is busy. The flip-flop 36 and the XOR gate 38 latch the transitions on the RXD line 34. The active high output, i.e. RX_PENDING, from the XOR gate 38 sets the JK flip-flop 42 which provides the active high RX_IN_PROGRESS signal. The output from the XOR gate 38 also resets the idle counter 40. The idle counter 40 is a free running counter which is clocked by BIT_CLK and counts bit times. When RX_PENDING is HIGH, the idle counter 40 is held in reset and remains so until the RX_PENDING goes low. If the transitions on the RXD input 34 cease indicating that no more data is being received, RX_PENDING will go low. RX_PENDING low means that the channel 6 is free, i.e. not busy. Without a reset, the idle counter 40 continues counting on the edges of BIT_CLK and after a predetermined number of bit times, the output of the idle counter 40 will go HIGH. The output of the idle counter 40 resets the JK flip-flop 42 on the next MCLK edge which clears the RX_IN_PROGRESS output. The signals BIT_CLK, MCLK are generated by the receive control circuit 21 in known manner as will be within the understanding of those skilled in the art.

Figure 6:
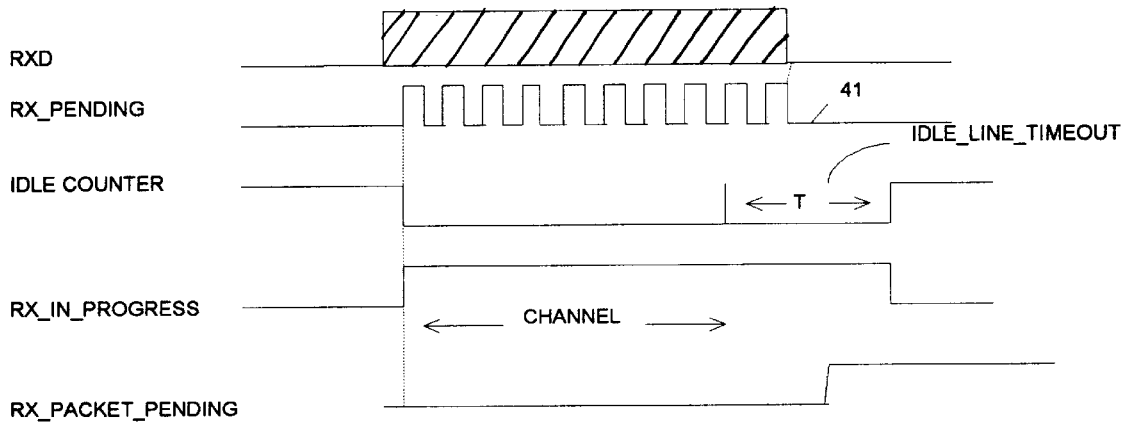
FIG. 6 is a timing diagram showing the timing of selected signals for the digital receiver of FIG. 3.

The relationship of the RXD, RX_PENDING and RX_IN_PROGRESS are shown in the timing diagram of FIG. 6. Activity on the RXD input 34 causes the RX_PENDING line to toggle and each pulse will clear the idle counter 40 before the counter can reset the JK flip-flop 42. The idle counter 40 stays reset or low until RX_PENDING goes low at 41. Once RX_PENDING goes low, the idle counter 40 times out after a time T. The time T is selected to represent a reasonable amount of time which indicates that no more data is to be received, and typically comprises a short time relative to a full data packet, for example, 10–12 bit times. RX_IN_PROGRESS is raised active HIGH on the first pulse of RX_PENDING which is clocked by MCLK and remains HIGH until reset by the idle counter 40 timing out after time T. RX_IN_PROGRESS active HIGH indicates that the communication channel 6 (FIG. 1) is busy, i.e. there is incoming receive data RXD.

Referring to FIG. 3, the RXD line 34 also provides an input to the receive data reception logic 23b comprising a RX shift register 44, ADDR compare logic 46, END_OF_PKT compare logic 48 and a RX data hold register 50. The receive data RXD is clocked, that is shifted, into the RX shift register 44 on the rising edges of BIT_CLK. The RX shift register 44 converts the serial RXD data stream into PARALLEL RX DATA which is outputted to the RX data hold register 50 on a byte-wide wide bus 51. The parallel output of the RX hold register 50 is coupled to the computer data bus 12a (FIG. 2) and the output of the RX hold register 50 is enabled when there is a match between the address field in the RXD packet and the address of the station 2. The signals for transferring the data bytes from the RX hold register 50 to the data bus 12a are controlled by the receive control circuit 21 in known manner.

The address detection is performed by the ADDR compare logic 46. The PARALLEL RX DATA from the RX shift register 44 is fed to the ADDR compare logic 46 on output 53 and the portion of the RX data corresponding to the address field is compared to the local ADDR identifier for the station 2. Each station 2 in the network 1 will have a specific ADDR identifier, and the ADDR identifier may be hard-wired, fixed by a DIP switch or stored in non-volatile memory (not shown). The output of the ADDR compare logic 46 comprises a MATCH output, which is active HIGH when there is a match between the address field in the PARALLEL RX DATA and the ADDR identifier. The MATCH output is connected to one input of an AND gate 52 and the other input of the gate 52 is connected to a signal ADDR_CHK. The ADDR_CHK signal is generated at the end of the address field in the RX packet and gates the MATCH line. The output from the AND gate 52 provides the input to a flip-flop 54 which is latched on the rising edge of clock CLK. The output of the flip-flop 54 produces an ADDR_MATCH_OK signal. The ADDR_MATCH_OK signal is the ENABLE for the RX hold register 50 and enables the RX hold register 50 allowing the transfer of PARALLEL RX DATA to the data bus 12a. The PARALLEL RX DATA is transferred in byte intervals by clocking the RX hold register 50 with the clock signal BYTE_CLK which is generated by the receive control circuit 21 as will be within the understanding of one skilled in the art.

Referring to FIG. 3, the signal ADDR_MATCH_OK also provides an input to another AND gate 56. The other input of the AND gate 56 receives the signal PKT_DONE which is generated by the END_OF_PKT compare logic 48. The END_OF_PKT compare logic 48 looks for an "end of packet" marker in the PARALLEL RX DATA bytes outputted by the RX shift register 44. On a match with the end-of-packet marker, the compare logic 48 generates the output signal PKT_DONE. The output PKT_DONE is "AND'd" with the ADDR_MATCH_OK signal and latched by a flip-flop 58 to produce the output signal RX_PACKET_PENDING. The signal RX_PACKET_PENDING going active (HIGH) means that the incoming RX packet matched the address of the station 2, reception has been completed and the RX packet is stored in memory in an input buffer. The RX_PACKET_PENDING signal comprises the interrupt RX_IRQ which is serviced by the interrupt handler 32 and causes the MAC layer 28 to process the RX packet stored in the input buffer.

The control signals BIT_CLK, BYTE_CLK, CLK, ADDR_CHK, MCLK, and RX_PKT_ACK are generated by the receive control circuit 21 in known manner as will be familiar to those skilled in the art.

Reference is again made to FIG. 6, which shows the relationship of the RX_PACKET_PENDING signal to other signals. As can be seen, RX_PACKET_PENDING goes HIGH shortly after the last bit in the RX packet is received and processed by the END compare logic 48, i.e. the output of the AND gate 56 is latched on the next edge of BIT_CLK.

Referring back to FIG. 3, the RX_IN_PROGRESS signal indicates that reception of RX packet from the communication channel 6 has commenced. The RX_PACKET_PENDING signal, on the other hand, indicates that the complete RX packet has been received and stored. The RX_PACKET_PENDING signal comprises the receive interrupt RX_IRQ which is processed by the interrupt handler 32 and notifies the MAC layer 28 that there is a pending RX packet in the input buffer. The RX_IN_PROGRESS and RX_PACKET_PENDING signals are also used by the Abort Control logic 22 for collision avoidance as described below.

Figure 4:
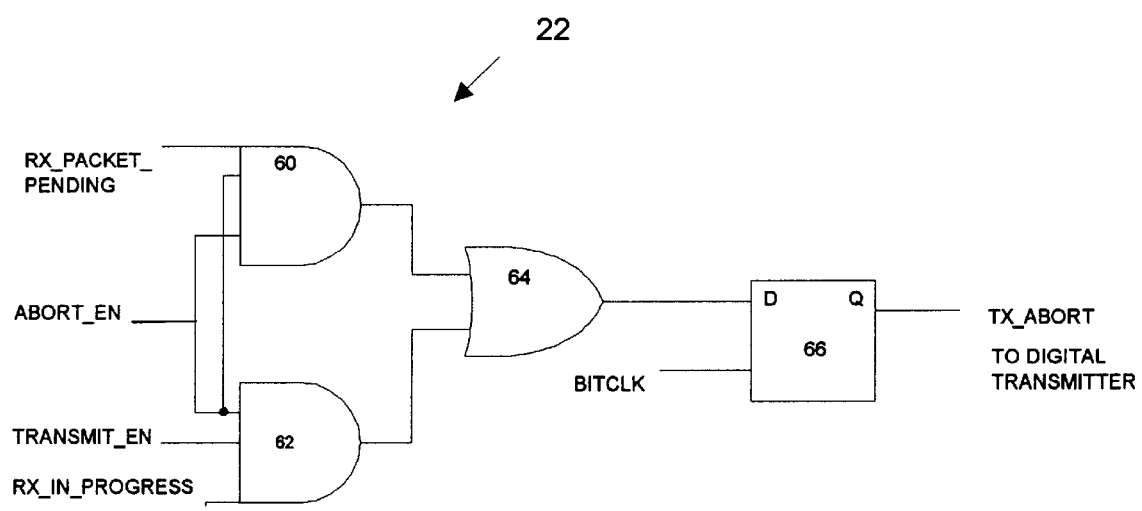
FIG. 4 is a circuit diagram of an abort control logic unit for the CSMA/AA controller of FIG. 2.

Reference is next made to FIG. 4, which shows the Abort Control logic 22 according to the present invention in more detail. The abort control logic 22 is responsive to the RX_IN_PROGRESS and RX_PACKET_PENDING signals. The logic 22 is also responsive to an input signal ABORT_EN. The ABORT_EN signal is generated by the controller 10 under the control of the MAC software layer 28. The abort logic 22 generates an output signal TX_ABORT. TX_ABORT provides an interrupt which is serviced by the interrupt handler 32 to abort the operation of the digital transmitter 18 under fault conditions which comprise collision events on the communication channel 6 as will be described in more detail below.

As shown in FIG. 4, the Abort Control logic 22 comprises first and second AND gates 60 and 62, an OR gate 64 and a flip-flop 66. The first AND gate 60 has an input connected to receive the RX_PACKET_PENDING signal, an input for the ABORT_EN signal, and another input for receiving a signal TRANSMIT_EN. The TRANSMIT_EN signal is generated by is logic in the digital transmitter 18 as will be described below with reference to FIG. 5. For the second AND gate 62, one input is connected to receive the signal ABORT_EN, and another input is connected to the TRANSMIT_EN signal. The third input of the AND gate 62 is connected to receive the RX_IN_PROGRESS signal generated by logic 23a in the digital receiver 20 as shown in FIG. 3. The output of the AND gate 60 is logically OR'd with the output of the second AND gate 62. The respective outputs from the AND gates 60,62 are connected to the inputs of the OR gate 64 and the output of the OR gate 64 is latched by the flip-flop 66 on an edge of the BIT_CLK signal.

The output of the AND gate 62 goes high when ABORT_EN and TRANSMIT_EN are enabled and RX_IN_PROGRESS is HIGH (i.e. the communication channel 6 is busy). The ABORT_EN and TRANSMIT_EN signals are enabled to initiate a transmission on the communication channel 6. The active state of the RX_IN_PROGRESS signal indicates that the RX data is being received and the communication channel 6 is busy, and therefore to avoid a collision between the receiver 20 and the transmitter 18, the abort control logic 22 generates a TX_ABORT to suspend operation of the transmitter 18. Similarly, the RX_PACKET_PENDING signal indicates that the channel 6 is busy, i.e. a RX packet is received and needs to be processed by the computer 8. If the digital transmitter 18 attempts to transmit while RX_PACKET_PENDING is active, the abort control logic 22 will generate the TX_ABORT output to suspend operation of the transmitter 20. During a transmit operation, ABORT_EN and TRANSMIT_EN are enabled, and with RX_PACKET_PENDING HIGH, the output of the AND gate 62 goes HIGH and is latched by the flip-flop 66.

Figure 5:
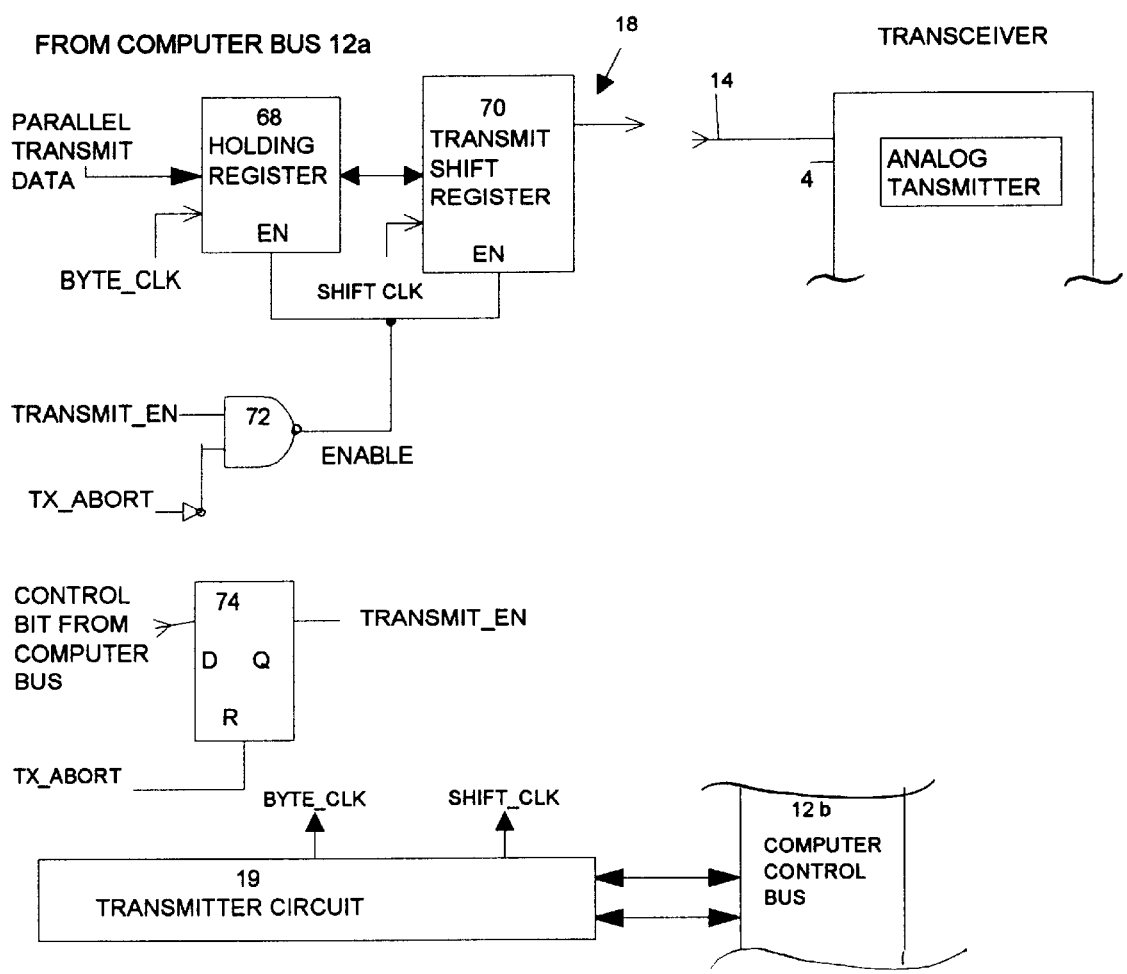
FIG. 5 is a circuit diagram of a digital transmitter for the CSMA/AA controller of FIG. 2.

As shown in FIG. 2, the digital transmitter 18 takes parallel data from the computer bus 12a and converts it into a serial data stream for transmission on the communication channel 6 by the transceiver 4. The logic for controlling the operation of the digital transmitter 18 is shown in FIG. 5. The digital transmitter 18 comprises a transmitter control circuit 19 and includes a transmit data holding register 68. The transmitter control circuit 19 interfaces with the control bus 12b of the computer 8 and generates transmit control signals including BYTE_CLK and SHIFT_CLK. The transmit data register 68 is coupled to the computer data bus 12a and the transmit data bytes are written into the register 68, as shown in FIG. 5. The output of the holding register 68 is coupled to a transmit shift register 70. The transmit shift register 70 converts the parallel data from the holding register 68 into a serial data stream output which is connected to the serial transmit data line 14 of the transceiver 4. The transceiver 4 includes a conventional analog transmitter for converting the data into form suitable for transmission on the communication channel 6.

The operation of the digital transmitter 18 is controlled by the TRANSMIT_EN and TX_ABORT signals. The TX_ABORT signal is generated by the abort control logic 22 described above with reference to FIG. 4. The TX_ABORT signal is inverted and provides one input to a NAND gate 72. The output of the NAND gate 72 is connected to enable inputs (active HIGH) on the transmit holding register 68 and the transmit shift register 70.

Referring to FIG. 5, the TRANSMIT_EN signal is the same signal which is used by the abort control circuit 22. The TRANSMIT_EN signal is generated by a flip-flop 74 which is coupled to the computer bus 12. Software in the MAC layer 28 writes a logic ONE on the data bus 12a to the location of the flip-flop 74 and the bit is latched by the flip-flop 74. The output of the flip-flop 74 provides the other input to the NAND gate 72. The digital transmitter 18 is enabled when TRANSMIT_EN is HIGH, i.e. set through the software, and TX_ABORT is LOW, i.e. RX_IN_PROGRESS and RX_PACKET_PENDING are FALSE as determined by the logic circuits 23a, 23b of the receiver 20. If at any time during the transmission sequence TX_ABORT becomes active, the output of the NAND gate 72 goes high and the transmit holding and transmit shift registers 68, 70 are disabled, and in response to the interrupt TX_ABORT the software executes code for suspending the transmit operation. When there is a transmit abort, the flip-flop 74 is cleared by the TX_ABORT tied to the reset input. This guarantees that the hardware generated TX_ABORT will, not only disable the digital transmitter 18, but at the same time clear the TX_ENABLE signal which was set by the host software.

Figure 7:
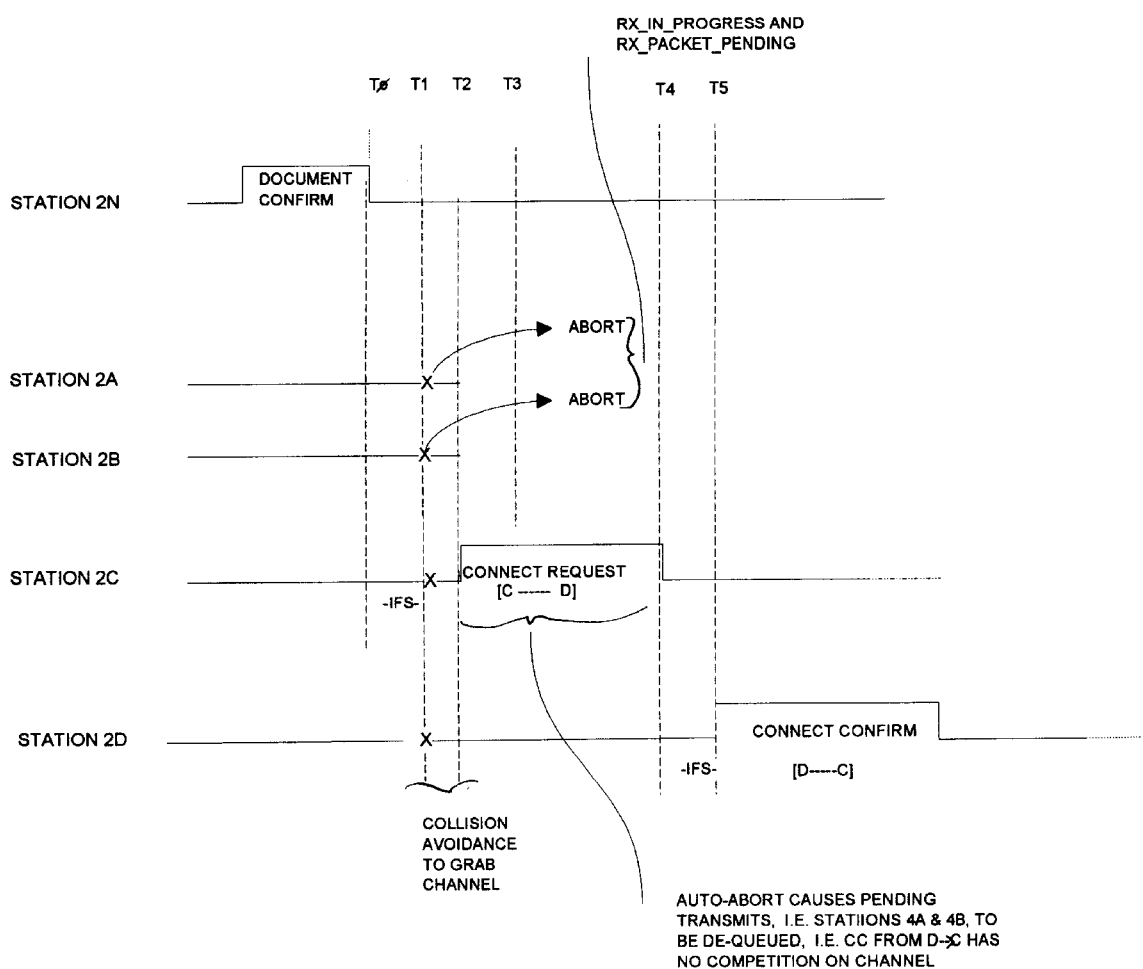
FIG. 7 is a timing diagram showing the relationship between Connect Request (CR) packets from stations attempting to reserve the communication channel.

Reference is next made to FIG. 7 which shows the operation of the CSMA/AA controller 10 for stations 2a, 2b, 2c and 2d vying to reserve the communication channel 6 for information transfer. In a system utilizing the CSMA protocol, the reservation comprises six packets: Connect Request (CR), Connect Confirm (CC), Data Transfer (XFR), Data Transfer Acknowledge (XACK), Disconnect Request (DR) and Disconnect Confirm (DC).

Referring to FIG. 7, stations 2a, 2b, 2c, 2d all wish to reserve the communication channel 6 for an information transfer. As shown in the figure, station 2n has just responded to a Disconnect Request (DR) by transmitting a Disconnect Confirm (DC) packet. At the end of the DC packet and after the expiry of the Inter-Frame Spacing (IFS) time, i.e. the minimum time between subsequent packets on the communication channel 6, the stations 2a, 2b, 2c, 2d vying for the channel 6 can begin by transmitting a Connect Request (CR) packet as indicated by time T1. Since the requesting stations 2a, 2b, 2c, 2d can all go on the channel 6 at time T1, it is preferable to use a transmit request skewing method, for example by including a random time period after the expiry of the IFS time. The purpose of this step is to skew the times at which the transmit requests hit the channel 6 from stations 2a, 2b, 2c and 2d which had been waiting for the DC packet from station 2n. By skewing the connect requests, collisions between the stations at time T1 are avoided.

Referring again to FIG. 7, station 2c has gained access to the communication channel 6 and at time T2 transmits a Connect Request (CR) packet. The Connect Request (CR) packet is placed on the communication channel 6 and addressed to station 2d. The Connect Request (CR) will also be received by the other stations 2 coupled to the channel 6 and the activity on the RX input 34 is detected by the logic circuit 23a in the respective receivers 20 and results in the RX_IN_PROGRESS signal being generated. The RX_PACKET_PENDING line will remain inactive in these stations, i.e. 2a and 2b, because there can never be a match with the address field in the CR packet. If stations 2a and 2b are trying to transmit on the channel 6, i.e. TRANSMIT_EN and ABORT_EN are active, the RX_IN_PROGRESS signal will cause the Abort Control logic 22 to generate a TX_ABORT as described above with reference to FIGS. 3 and 4. The TX_ABORT suspends the transmit operation of the stations 2a and 2b at time T2 as shown in FIG. 7. Starting at time T2 the destination station 2d will also be prevented from transmitting if the ABORT_EN line has been enabled.

Referring to FIG. 7, once the complete packet Connect Request (CR) is received at time T4, the logic circuit 23b in the receiver 20 will generate RX_PACKET_PENDING (i.e. active HIGH). In response to the RX_PACKET_PENDING signal, the destination station 2d processes the received packet and prepares to respond with a Connect Confirm (CC) packet. Before responding to the CR packet with a Connect Confirm (CC) packet, the station 2d waits until the expiry of the IFS time and then begins transmitting at time T5. The transmission of the CC packet by station 2d will activate the RX_IN_PROGRESS signals in the other stations, i.e. 2a and 2b. If stations 2a and 2b attempt to transmit by enabling TRANSMIT_EN, and ABORT_EN is active, a TX_ABORT will be generated to suspend the transmission attempt.

Referring to FIG. 7, it can be seen that once station 2c has its CR packet on the channel 6, the other stations 2a, 2b and 2d are prevented from transmitting by the abort control logic 22 until the transmission of the CR packet is complete. This prevents the collision of the packets from the stations 2a, 2b and 2d, and also results in the suspension of the transmits so that traffic on the channel 6 is cleared thereby permitting the destination station 2d to send the Connect Confirm (CC) packet after the expiry of the IFS time. Without the auto abort feature according to the present invention, multiple CR packets can hit the channel 6. This causes unnecessary traffic and also delays the transmission of the Connect Confirm (CC) packet from the destination station, e.g. 2d. Furthermore, there will be competition by the stations responding to the subsequent CR packets with their own CC packets. Because one Connect Request has already been granted, i.e. by station 2d in FIG. 7, the remaining Connect Requests will not be granted and the channel 6 will be tied up needlessly. An advantage of the present invention is the ability to avoid a situation where multiple stations 2 have transmitted Connect Request (CR) packets on the channel 6 and the resultant need for the MAC software in each station 2 to execute "back-off" procedures. The back-off processing itself can produce a collision potential.

Figure 10:
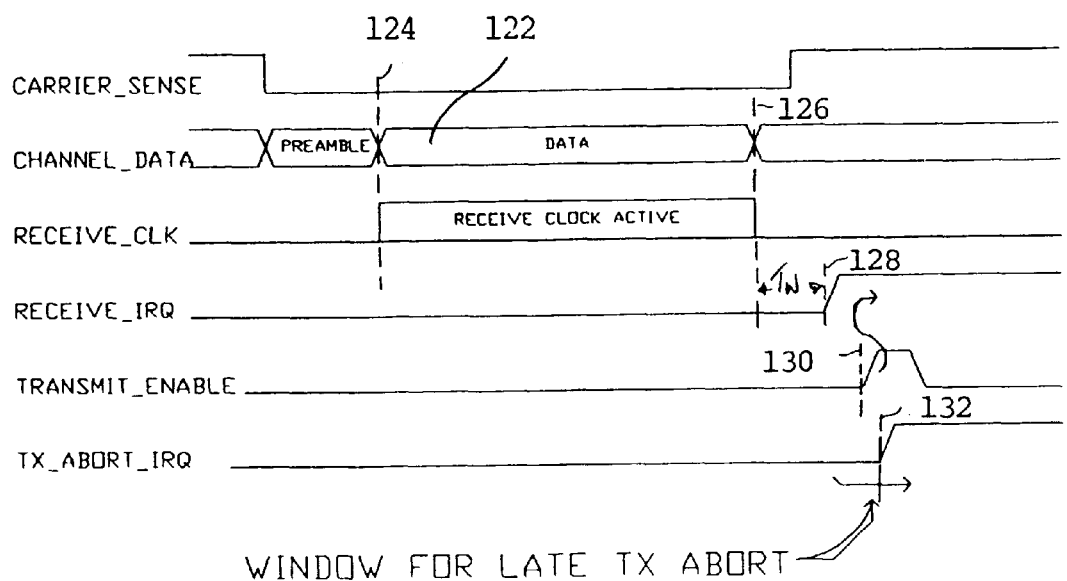
FIG. 10 is a timing diagram showing the timing of selected signals during another occurrence of a late TX ABORT.
Figure 11:
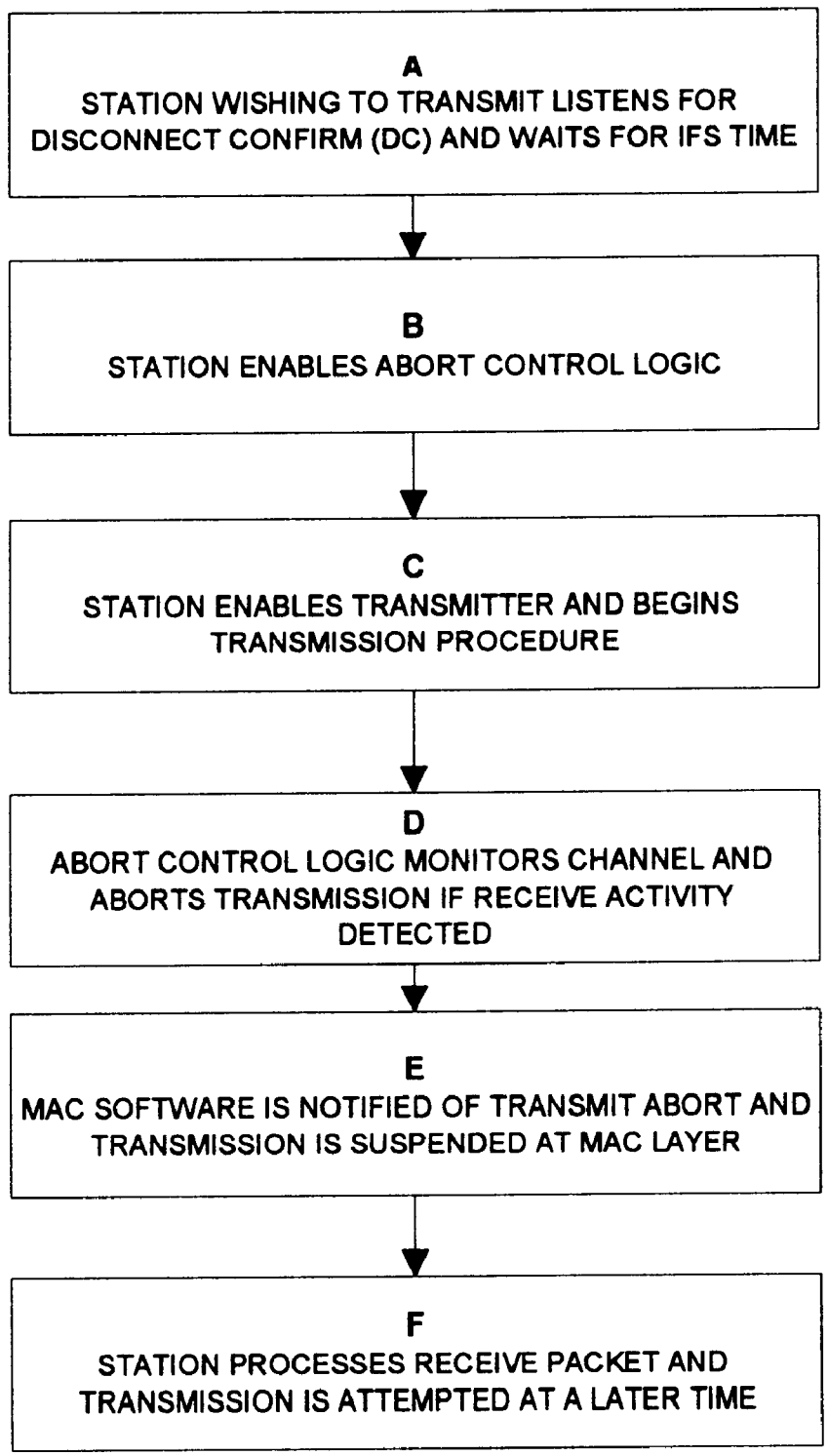
FIG. 11 is a flowchart showing a sequence for initiating a transmission with auto abort collision avoidance in accordance with the present invention.

The operation the CSMA/AA controller 10 is further illustrated by the flowchart in FIG. 11. The CSMA with Auto Abort controller 10 according to the present invention comprises a system where software control, i.e. through the MAC software layer 28, initiates transmission, and the activation of abort control logic 22 provides the capability to issue unconditional hardware generated aborts during the transmission procedure in order to avoid collision on the communication channel 6. According to the invention, a station wishing to reserve the communication channel for information transfer by transmitting a Connect Request (CR) packet, first begins by performing the necessary checks to determine the readiness of the channel 6 (Block A). If the channel 6 is available, the station 4 enables the transmitter 18 with the automatic-abort activated (Blocks B and C). By activating the auto-abort mode (Block B), the abort control logic 22 will capture situations where the software, i.e. MAC layer 28, has missed a collision or potential collision condition (Block D). The abort control logic 22 aborts the transmission and the MAC layer 28 suspends the transmission procedure (Block E). The MAC layer 28 attempts the transmission sequence at a later time (Block F). The operation of the subject invention during various collision scenarios is described below with reference to FIGS. 8 to 10.

Figure 8:
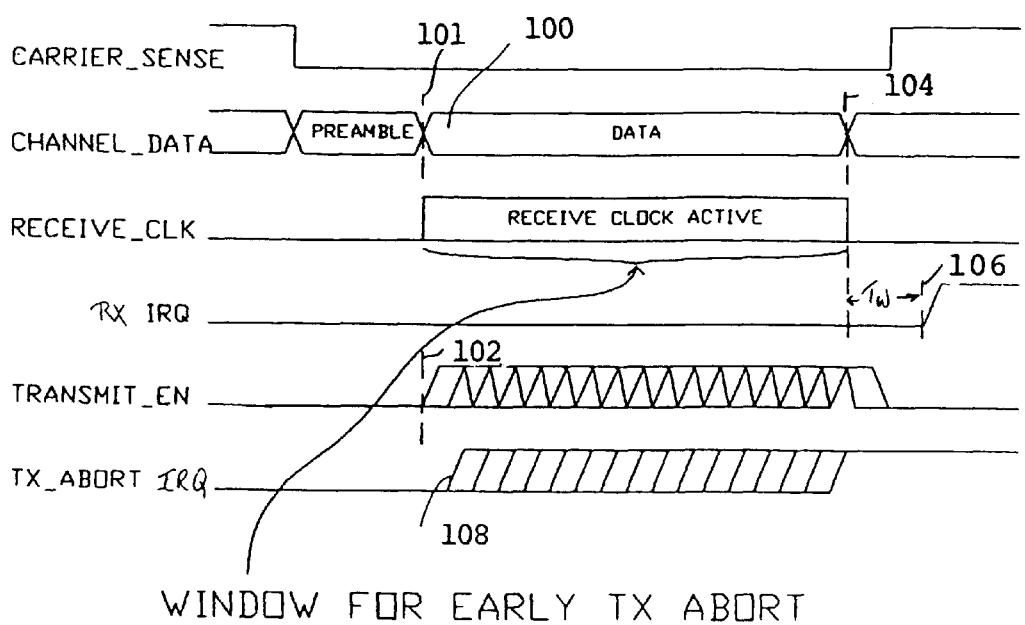
FIG. 8 is a timing diagram showing the timing of selected signals during the occurrence of an early TX ABORT.

Referring to FIG. 8, the operation of the controller 10 when transmission of a packet is initiated during reception of an incoming packet is illustrated as Scenario #1. In this scenario, a Connect Request (CR) packet 100 begins arriving from the communication channel 6 at time 101. The incoming RX packet is indicated by the RECEIVE_CLK (or RX_IN_PROGRESS). RECEIVE_CLK is a locally generated clock used to send decoded serial RX data on input line 34. The RECEIVE_CLK only runs when data is being received from the transceiver 4, it does not run when the receiver subsystem in the transceiver 4 is inactive. The station 4 asynchronously begins its transmission sequence and the MAC software layer 28 checks if a CR packet 100 has been received. Since the MAC layer 28 does not know that a CR packet 100 is incoming, the check passes and the transmission sequence continues with the transmitter 18 being enabled at time 102. As shown in FIG. 8, the interrupt RX IRQ is not generated until the entire CR packet 100 is received at time 104 and a latency period $T_w$ has expired at time 106. According to the invention, the MAC software layer 28 enables the transmitter 18 by writing the control bit (FIG. 5) to activate TRANSMIT_EN at time 102, and the ABORT_EN line (FIG. 4) is also activated to enable the abort control logic 22 (FIG. 4). With the abort control logic 22 enabled, the incoming CR packet 100 is detected and the RX_IN_PROCESS signal causes a TX_ABORT interrupt to be generated at time 108 which disables the transmitter 18 (FIG. 5). The interrupt handler 32 acknowledges the transmit interrupt TX_ABORT and notifies the MAC software layer 28 which suspends the transmit operation and awaits the complete reception of the CR packet 100. After reception of the complete packet 100, the MAC software 28 processes the packet 100 in accordance with the CSMA reservation protocol.

In reference to FIGS. 4 and 8, RX_IN_PROGRESS samples the state of TRANSMIT_EN bit. If TRANSMIT_EN is active (HIGH), the abort control logic 22 generates a TX_ABORT interrupt which de-asserts TRANSMIT_EN (FIG. 5). RX_IN_PROGRESS allows the interrupt handler 32 to respond to the transmit abort condition as soon as it is detected, rather than at the time when the receive complete interrupt RX_IRQ, i.e. RX_PACKET_PENDING, is generated. This covers the timing window where physical channel reception is in progress at the time the TRANSMIT_EN bit is set. This feature improves the execution time of the interrupt handler 32 in a system 1 utilizing controllers 10 according to the present invention.

Figure 9:
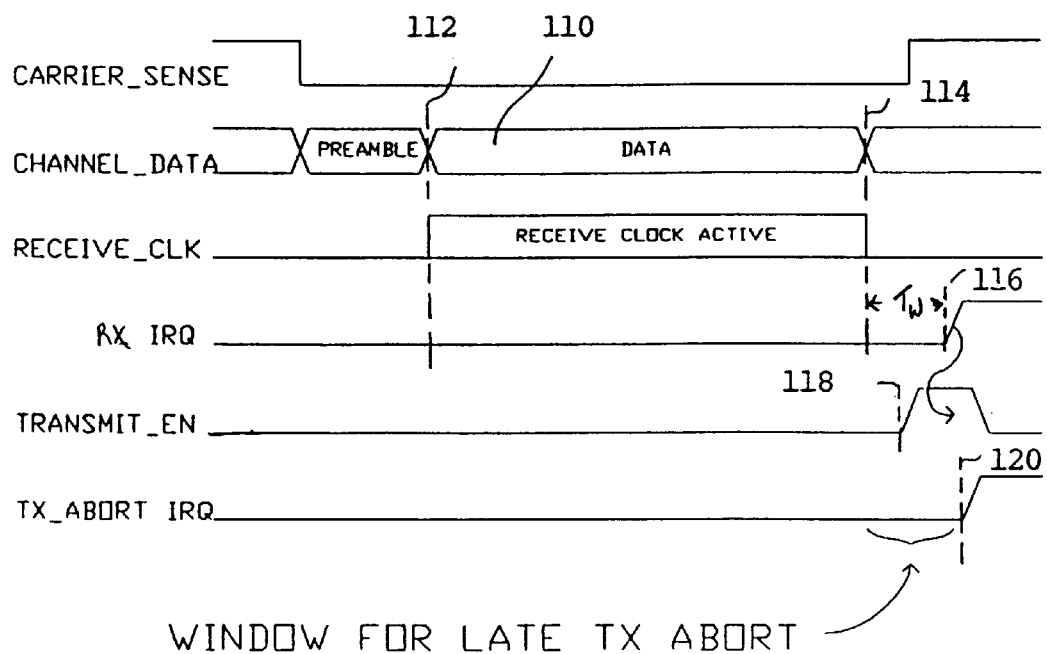
FIG. 9 is a timing diagram showing the timing of selected signals during the occurrence of a late TX ABORT.

Reference is next made to FIG. 9, which illustrates Scenario #2 in which the CSMA/AA controller 10 detects a collision condition between the end of the incoming packet reception and the generation of the interrupt RX IRQ. This is a fault condition because a packet has arrived which has not been checked by the system, while a subsequent unrelated packet is awaiting transmission. A conventional CSMA/CA controller would miss the pending interrupt RX IRQ and proceed with transmitting a packet thereby causing a collision. The CSMA/AA controller 10 according to the present invention prevents the entry of packet on the channel at the termination of the IFS time (plus the random CA time).

As shown in FIG. 9, an incoming CR packet 110 begins arriving at time 112. The CR packet 110 is completely received at time 114, and the CSMA/AA controller 10 begins a latency period $T_w$ before generating the receive interrupt RX IRQ at time 116. Asynchronously and before time 116, the station initiates a transmission sequence at time 118. The MAC software 28 checks (e.g. status register flags) to confirm that no CR packet 110 has been received and the test passes because RX IRQ has not yet been generated. The transmitter 18 is enabled by activating TRANSMIT_EN (i.e. at time 118) and ABORT_EN, and the transmitter 18 waits for the IFS timeout to expire before entering the channel 6. At time 116, the receive interrupt RX IRQ is generated after the CSMA controller 10 has updated the required status registers and DMA counters. Once the reception of the CR packet 110 is completed at time 114, RX_PACKET_PENDING goes HIGH and with ABORT_EN activated, the abort control logic generates a TX_ABORT interrupt at time 120 to suspend the transmit operation. In other words, the rising edge of the RX_PACKET_PENDING signal samples the state of the TRANSMIT_EN line, and if active TX_ABORT is generated and the TRANSMIT_EN is cleared or de-asserted. The interrupt handler acknowledges the TX_ABORT and services the receive interrupt RX IRQ. The steps executed in servicing the interrupt will depend on the structure of the MAC layer 28, and may, for example, comprise clearing the RX IRQ, i.e. asserting RX_PKT_ACK (FIG. 3), and setting a flag indicating that there is a packet in the input buffer ready for processing. The MAC layer 28 polls the flag and then reads the packet from the input buffer and performs the required processing.

In reference to FIGS. 4 and 9, the rising edge of the interrupt RX_IRQ (i.e. RX_PACKET_PENDING) samples the state of the TRANSMIT_EN bit. If TRANSMIT_EN is active, interrupt TX_ABORT is generated which clears the flip-flop 74 (FIG. 5) to clear the TRANSMIT_EN bit. The interrupt handler 32 services the TX_ABORT interrupt and notifies the MAC layer 28 of the suspended transmission.

Reference is next made to FIG. 10 which illustrates Scenario #3 where the CSMA/AA controller 10 avoids a collision between a transmit packet and a receive packet when the receive interrupt is pending. This is a fault condition because a packet has arrived which has not yet been checked by the system, while a subsequent unrelated packet is awaiting transmission. A conventional CSMA/CA controller would allow the entry of the transmit packet onto the channel upon termination of the IFS timeout plus the random CA time.

As shown in FIG. 10, an incoming Connect Request (CR) packet 122 begins arriving at time 124 and reception of the packet 122 is completed at time 126. The CSMA/AA controller 10 then begins a latency period $T_w$ before generating the interrupt RX IRQ. At about the same time, a higher priority system interrupt occurs which blocks the interrupt handler 32 from servicing other lower priority interrupts. The reception of the CR packet 122 is completed and a receive interrupt RX IRQ is generated at time 128. The random back-off period to queue a synchronous transmission expires, and a TIMER IRQ is generated. The TIMER IRQ has priority over the RX IRQ interrupt, and the interrupt handler 32 services the TIMER IRQ and packet transmission is commenced by activating TRANSMIT_EN and ABORT_EN at time 130. The pending receive packet 122 means that RX_PACKET_PENDING will be active, and this will cause the abort control logic 22 to generate a TX_ABORT interrupt at time 132. The interrupt handler 32 acknowledges the transmit interrupt TX_ABORT, suspends the transmission procedure and services the pending receive interrupt RX IRQ.

In reference to FIGS. 4 and 10, the rising edge of the TRANSMIT_EN bit samples the state of the RX_IRQ (i.e. RX_PACKET_PENDING) interrupt. If RX_PACKET_PENDING is active, a TX_ABORT interrupt is generated which clears the flip-flop 74 to de-assert TRANSMIT_EN. This covers the timing window where the software generated timer interrupt IFS TIMEOUT indicates that the MAC software 28 can request a transmission. At this point a reception has just completed and has not been processed due to the servicing of the IFS TIMEOUT interrupt. The interrupt handler 32 notifies the MAC layer 28 that the transmission has been aborted.

It is also possible for a collision to occur between two competing stations outside the window of the RX IRQ. The window for such a collision is small, and therefore will arise infrequently. The occurrence of such a collision comprises the following sequence of events beginning with the arrival of a Connect Request (CR) packet from the communication channel 6. The station 4 asynchronously, i.e. not triggered by the timer interrupt IFS TIMEOUT, initiates a transmission sequence. The station 4 performs a check to confirm that no CR packet has been received, and the test passes because the system (i.e. MAC software module 28) does not know that a CR packet is being received. While the MAC module 28 is in the execution path for enabling transmission, the code is interrupted by a RX IRQ on the reception of the CR packet and control passes to the interrupt handler 32. The interrupt handler 32 begins processing the received packet, for example, by setting a flag to indicated the state change to the MAC software module 28. The interrupt handler 32 then de-asserts the RX IRQ interrupt through the RX_PKT_ACK signal (FIG. 3), and control returns to the transmit execution path. The transmit path enables transmission by activating TRANSMIT_EN and ABORT_EN. The transmit packet gets on the communication channel 6 because there is no current reception in progress (i.e. Scenario #1 in FIG. 8), no transmission in progress when a RX IRQ triggers (i.e. Scenario #2 in FIG. 9), or no unserviced RX IRQ pending at the time the transmission is initiated (i.e. Scenario #3). As a result, a reservation collision will occur when the other stations detect the back-to-back CR packets with the following implications: (i) stacked CR's in the input buffer; (ii) altered ordering of the receive and timer interrupts; and (iii) asymmetric or total physical channel collision. Events (i) and (ii) are reservation collisions which are recoverable through appropriate exception processing by the MAC software 28, but event (iii) presents a non-recoverable reservation failure. It will be appreciated that physical channel collision remains non-recoverable in a wireless environment due to a station's inability to sense transmission from other stations coincident with its own transmission.

As a result of the reservation collision, the MAC software 28 in each station begins exception processing which includes executing a back-off procedure and then after a timeout period attempting to transmit on the channel 6. The timeout period is preferably triggered by a hardware timer implementing a random delay. (The random delay has the effect of skewing the transmit attempts of the various stations 4 vying for the communication channel 6, which can improve performance as described above with reference to FIG. 7.) The subsequent reservation attempts are executed with ABORT_EN enabled so that the controller 10 performs collision avoidance as per Scenarios 1 to 3 described above.

To prevent metastability that could arise if the TRANSMIT_EN bit (FIG. 5) were in transition at the same time the receive interrupt RX IRQ were in transition, a hardware semaphore is called whereby the system access which sets the TRANSMIT_EN bit is semaphore locked via arbitration circuitry from the receiver control subsystem which sets the RX IRQ bit. This ensures that only on e operation takes place, and thus the transition times of the two signals are guaranteed to be distinct.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or privilege is claimed are defined as follows:

1. A method for avoiding collision between stations communicating over a single communication channel coupled by a local area network LAN, each station including a transceiver for operating on the communication channel and receiver means for receiving data from the transceiver and transmitter means for transmitting data to the transceiver and controller means for controlling the transfer of data between the station and the communication channel and logic circuit means, said method comprising the steps of:

(a) determining if said communication channel is available;

(b) initiating a data transmission by generating a signal through said controller means for enabling the transmitter means when said communication channel is available from step (a);

(c) enabling said logic circuit means through said controller means;

(d) commencing transmission of data on said communication channel through said transceiver and transmitter means;

(e) monitoring receive data activity in said receiver means using said logic circuit means;

(f) generating an abort signal through said logic circuit means in response to the detection of receive data activity in said receiver means;

(f1) without executing back-off algorithms, using said abort signal to disable operation of said transmitter means; and (g) notifying said controller means of an aborted transmission.

2. The method for collision avoidance as claimed in claim 1, wherein the communication is performed on a wireless medium.

3. The method for collision avoidance as claimed in claim 2, wherein data transmitted on the communication channel is transmitted in packets in accordance with a CSMA/CA protocol.

4. The method for collision avoidance as claimed in claim 1, wherein said step of monitoring receive data activity includes detecting reception of an incomplete incoming packet.

5. The method for collision avoidance as claimed in claim 4, wherein said abort signal is generated independently of said controller means.

6. The method for collision avoidance as claimed in claim 1, wherein said step of monitoring receive data activity comprises detecting reception of a complete incoming packet and generating an abort signal shortly after an incoming packet is received.

7. The method of claim 1 wherein the transmitter and the receiver are digital.

* * * * *